Nov. 30, 1965

J. J. DINEEN 3,220,178

HEAT ENGINE

Filed March 5, 1964

INVENTOR.
JOHN J. DINEEN

BY
Raymond W Cotten
ATTORNEY

Nov. 30, 1965    J. J. DINEEN    3,220,178
HEAT ENGINE
Filed March 5, 1964    3 Sheets-Sheet 2

INVENTOR.
JOHN J. DINEEN
BY
ATTORNEY

Nov. 30, 1965 J. J. DINEEN 3,220,178
HEAT ENGINE
Filed March 5, 1964 3 Sheets-Sheet 3

INVENTOR.
JOHN J. DINEEN
BY
Raymond W Cooker
ATTORNEY

United States Patent Office

3,220,178
Patented Nov. 30, 1965

3,220,178
HEAT ENGINE
John J. Dineen, 310 4th St., East Northport,
Long Island, N.Y.
Filed Mar. 5, 1964, Ser. No. 349,651
13 Claims. (Cl. 60—24)

This invention relates to heat engines for modified Stirling cycle operation, and is applicable to power generation as well as to refrigeration.

A power generator embodying the present invention utilizes heat applied to its cylinder head from a suitable source to produce mechanical forces, whereas refrigeration equipment incorporating the invention will be provided with an external power source so that the cylinder head of the apparatus will serve as a heat sink. Both types of equipment are referred to hereinafter as engines, and where used for refrigeration, the means for heating the cylinder head transfers heat from a body to be cooled to the cylinder head.

Stirling cycle equipment has not been in extensive use in recent years for a variety of reasons, among which are the better distribution of electric power, the advent of the automobile and airplane, the increased production of current types of internal combustion engines, the excessive weight per horsepower of previously known Stirling cycle engines, their low efficiencies, the high pressures developed and the relatively high temperatures experienced at the cylinder heads of such engines.

But it is well known that Stirling cycle engines possess certain advantages over the more widely used internal combustion engines including quiet operation, potentially high efficiency and adaptability to the use of any of a large number of sources of heat including liquids, gases, solids, waste heat, electrically supplied heat and solar radiation. Stirling cycle engines require no ignition system and by the proper selection of heat sources, the exhaust gases will be colorless, odorless and free from carbon monoxide. No carburetors or fuel injectors are required and relatively low speed operation can be employed. The many other advantages inherent to Stirling cycle engines are well known to those skilled in the art.

In a Stirling cycle engine of the single cylinder type, the power piston remains at the lowest temperature in the cycle, permitting the use of self-lubricating piston packings of such materials as Teflon. Where two cylinders are used, one for compression and the other for expansion, with the regenerator between them, then of course, one cylinder would necessarily employ hot piston rings.

A true Stirling cycle is characterized by isothermal compression followed by an addition of heat at constant volume from a regenerator, then an isothermal expansion, and finally a constant volume removal of heat for storage in the regenerator. Thus far, these conditions have never been achieved in actual practice.

It is known of course, in conjunction with Stirling cycle engines, that the displacer piston cannot move instantaneously and that the expansion and compression functions are more nearly adiabatic than isothermal. Moreover, movements of the displacer piston occurring near the ends of the stroke have little effect on engine performance, since the moment arm available from the crankshaft during these periods is small. By having the displacer piston transfer fluid throughout the cycle, as occurs in contemporary engines, unnecessary losses in performance result, since the compression of appreciable percentages of hot fluids requires power and the expansion of appreciable percentages of cool fluids reduces the power produced during expansion. The inability to achieve isothermal operation also results in power loss and in appreciable reduction of thermal efficiency because less heat can be stored in the regenerator for use later in the cycle.

It is among the foremost objects of the present invention to approach the isothermal functions of the ideal Stirling cycle by providing for the more effective removal of heat during the compression stroke and the more effective addition of heat during the expansion stroke. This is achieved by increasing the surface areas of the members entering into the heat exchange operation and by not permitting large volumes of fluid to exist, because of piston movement, that are not penetrated by heat exchange members.

It is also an important aspect of this invention that the positions of the displacer piston are programmed so that the maximum volume of fluid consistent with manufacturing tolerances will be present in the proper chamber during the periods of compression and expansion respectively. This is accomplished by cam actuation of the displacer piston in such a manner that it follows in close proximity to the power piston during the expansion stroke and dwells in close proximity to the cylinder head during the compression stroke.

It is also among the objects of the present invention to utilize a working fluid having a ratio of specific heats much lower than working fluids previously proposed so as to cause the adiabatic cycle to approach isothermal operating conditions. Whereas hydrocarbon fluids exhibit highly desirable characteristics based upon the ratio of specific heats at constant pressure with respect to specific heats at constant volume, under the conditions encountered in use, physical changes render most of them somewhat less desirable than acetylene, which is preferred for operation in accordance with the present invention. Acetylene exhibits a relatively favorable ratio of specific heats and also remains relatively stable under the operating conditions to which it is exposed.

Heat engines of the type to which the present invention is directed comprise a housing, a cylinder supported by the housing, a cylinder head closing one end of the cylinder, means for heating the head, a power piston reciprocably received in the cylinder for movement through compression and expansion strokes, a displacer piston reciprocably received in the cylinder between the power piston and head defining a hot chamber with the head and a cool chamber with the power piston, a shaft journalled in the housing, transmission means interconnecting the power piston and shaft, cam means driven by the shaft, follower means engaging the cam means for driving the displacer piston, heat dissipating means provided for the cylinder, a regenerator providing passage means interconnecting the chambers, and a working fluid filling the passage means and chambers. In conjunction with such an engine, the present invention provides a surface formed on the cam means maintaining the displacer piston in substantially constant closely spaced relationship with the head during a major portion of the compression stroke and maintaining the displacer piston in substantially constant closely spaced relationship with the power piston during a major portion of the expansion stroke. It is also contemplated to provide complementary interfitting heat conducting elements carried by the displacer piston and head respectively, and complementary interfitting heat conducting elements carried by the displacer piston and power piston respectively.

The present invention also contemplates means for replacing working fluid in the passage means and chambers with cooler working fluid. Spacing means of relatively low heat conductivity is preferably interposed between the cylinder and its head. The replacement of the working fluid in the chambers is preferably achieved by means of a pump driven by the engine. The engine contemplated is preferably provided with throttle means providing a passage communicating with the cool chamber defined between opposed surfaces of the two pistons and a valve for controlling flow through such passage. Heat is preferably applied to the head by means of a fuel burner positioned adjacent thereto. The follower is preferably biased towards the cam means by fluid pressure, employing an arrangement which might be designated as a pneumatic spring.

The cam is preferably located within the projection of the cylinder bore and the power piston and displacer piston rod are preferably concentric. To assure quiet operation, the cam will engage the displacer piston cam follower at all times. During the compression stroke of the power piston, the displacer piston will remain closely adjacent the head of the cylinder for as long a period as possible. During the expansion stroke, the displacer piston will remain closely adjacent the power piston as long as possible.

A more complete understanding of the invention will follow from a description of the accompanying drawings wherein.

Figure 1:
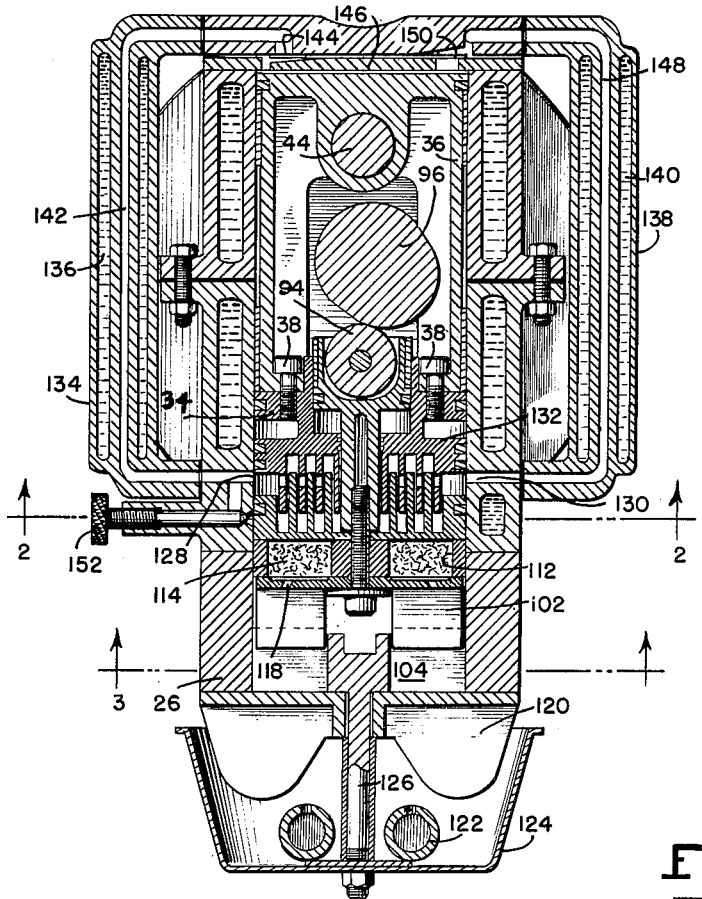
FIG. 1 is a sectional elevation of a Stirling cycle engine embodying the present invention.
Figures 2, 3:
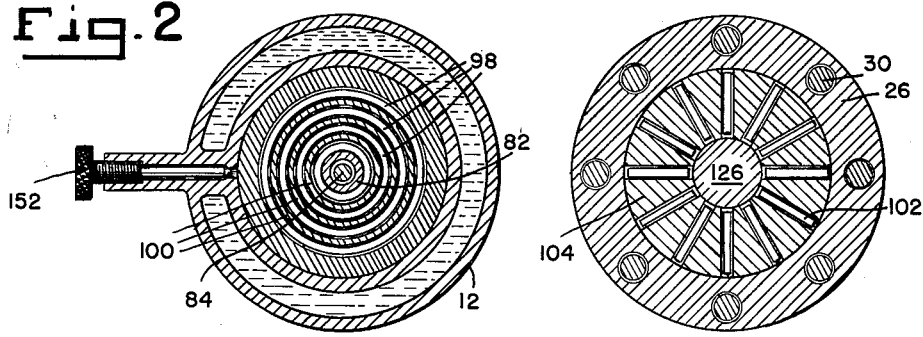
FIG. 2 is a section taken along line 2—2 of FIG. 1.
FIG. 3 is a section taken along line 3—3 of FIG. 1.

The housing 10 provides a cylinder 12 containing a jacket 14 for cooling purposes and having an inner wall 16 engaged by the rings 18 of a power piston 20 and the ring or rings 22 of a displacer piston 24. The end of the cylinder 12 in which the displacer piston 24 reciprocates is extended by means of a low conductivity annulus 26 constituting an extension of the cylinder, and closed by a head 28 which is secured to the cylinder by means of bolts 30 extending through the wall of the annulus 26 into threaded engagement with openings 32 formed in the wall of the cylinder 12.

The power piston 20 is provided with a flanged extension 34 to which a yoke 36 is secured by means of screws 38. This yoke defines a piston 40 provided with a sealing ring 42 to serve as a pump piston and the yoke also carries a pin 44 pivotally engaging connecting rods 46 in driving relationship with a pair of cranks 48 secured to a crankshaft 50.

Figure 4:
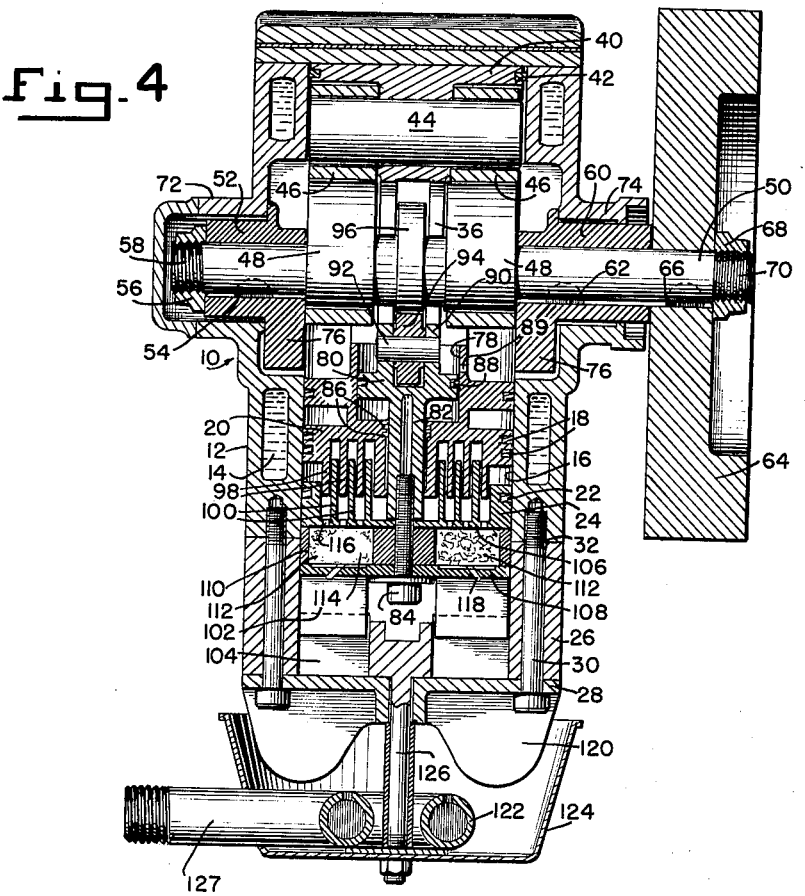
FIG. 4 is a sectional elevation of the engine taken at right angles to the section depicted in FIG. 1.

To the left end of the crankshaft 50 as viewed in FIG. 4, a bushing 52 is secured against rotation by means of a key 54 and retained against axial movement on the shaft by means of a nut 56 received on the threaded end 58 of the crankshaft. The right end of the crankshaft 50 as viewed in FIG. 4 has a similar bushing 60 secured thereto against rotation by means of a key 62 and a flywheel 64 is secured to the right end of the crankshaft by means of a key 66, these members being held against axial movement relative to the shaft by means of a nut 68 received on the threaded end 70 of the crankshaft.

The bushings 52 and 60 are received in journals 72 and 74 respectively, and each of the bushings carries a counterweight 76 to provide a degree of balance to compensate the cranks 48.

The crank end of the power piston 20 contains a counterbore 78 for reception of a piston 80 having a rod portion 82 extending through a central opening in the power piston and secured to the displacer piston 24 by means of a bolt 84. Packing rings 86 provide a seal between the rod portion 82 and the power piston 20 and a packing ring 88 provides a seal between the piston 80 and the counterbore 78. Ports 89 provided in the wall of the cylinder defined by the counterbore 78 are controlled by the piston ring 88 to maintain the initial charge pressure in the chamber formed by the piston 80 in the counterbore 78 so that any fluid leaking past the piston ring 88 will be replaced. A skirt 90 extending from the piston 80 receives a pin 92 rotatably receiving a cam follower 94 cooperating with a cam 96 secured to the crankshaft 50 intermediate the cranks 48.

The head end of the power piston 20 is formed with a plurality of annular fins 98 complementing a plurality of annular fins 100 carried by the crank end of the displacer piston 24, thereby providing substantial heat exchange surfaces between the adjacent ends of these two pistons. The head end of the displacer piston is provided with a substantial number of radial fins 102 complementing radial fins 104 carried by the inner surface of the cylinder head 28, these interfitting radial fins providing substantial areas for the exchange of heat. The displacer piston 24 has a wall 106 supporting the annular fins 100 spaced from a wall 108 adjacent the cylinder head by means of a low conductivity disc 110 formed with pockets 112 containing a heat conductive mesh or gauze 114, the walls 106 and 108 containing perforations 116 and 118 respectively, to permit working fluid to pass completely through the displacer piston as this piston reciprocates in the cylinder. The perforations 118 are shown as disposed at an acute angle to the vertical so as to induce velocity along the heat exchange surfaces during the movement of fluid. The head 28 is also formed with external fins 120 to which heat is applied by means of a burner 122 suspended in a pan 124 by means of a bolt 126 from the head 28. Suitable fuel to supply the burner will be introduced by means of a supply tube 127.

The cylinder 12 is provided with diametrically opposed purge ports 128 and 130 controlled by the piston rings 18 of the power piston, the port 128 being connected to an aftercooler 134 containing a liquid cooled jacket 136 and the port 130 being connected to a precooler 138 having a liquid cooled jacket 140. The aftercooler contains a passage 142 capable of communication with the pump piston 40 through a check valve 144 in the form of a reed capable of admitting fluid from the aftercooler to the head of the pump piston in cooperation with the valve plate 146. The precooler 138 contains a passage 148 capable of communication with the head of the pump piston 40 through a check valve 150 in the form of a reed cooperating with the valve plate 146 so that fluid can be discharged as the pump piston 40 advances towards the valve plate 146 to expel working fluid from the chamber of the pump through the passage 148 to replace working fluid between the power piston and displacer piston with cooler working fluid.

A throttle 152 can be adjusted to bypass more or less of the working fluid from the head end of the power piston to the aftercooler when the purge ports are closed in order to vary the operation of the engine.

In a single cylinder engine of the type depicted for purposes of illustration, it will be necessary to employ external power, either manual or otherwise, in order to move the power piston through one compression stroke after heat has been applied by the burner for a sufficient length of time. During the initial portion of the cranking action to produce the compression stroke, the cam 96 will move the displacer piston 24 towards the cylinder head, causing the regenerator defined by the mesh or gauze 114 to absorb a substantial portion of the heat from the working fluid which has been heated adjacent to the cylinder head 28. As the compression stroke advances, the working fluid between the power piston and the displacer piston will be compressed and passed through the regenerator causing its pressure and temperature to increase by the absorption of heat from the displacer piston and regenerator assembly. As the crankshaft 50 passes beyond its dead center position, as will be evident from FIG. 5 of the drawings, both the power piston 20 and the displacer piston 24 will move in a direction away from the cylinder head 28 by virtue of the expansion of the heated working fluid at a higher energy level than existed during the compression stroke because of the increase in temperature. The power piston will move to its bottom dead center position represented by the value of 180° in FIG. 5, but because of the energy stored in the flywheel 64, a new compression stroke will occur and operation of the engine will continue so long as heat from the burner 122 is applied to the cylinder head 28.

Figure 5:
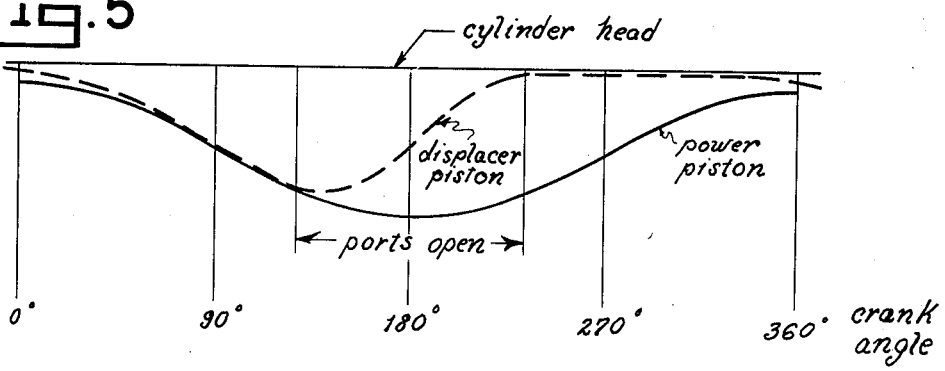
FIG. 5 is a diagram depicting the positions of the power and displacer pistons corresponding to various crank angles throughout a complete cycle.
Figure 6:
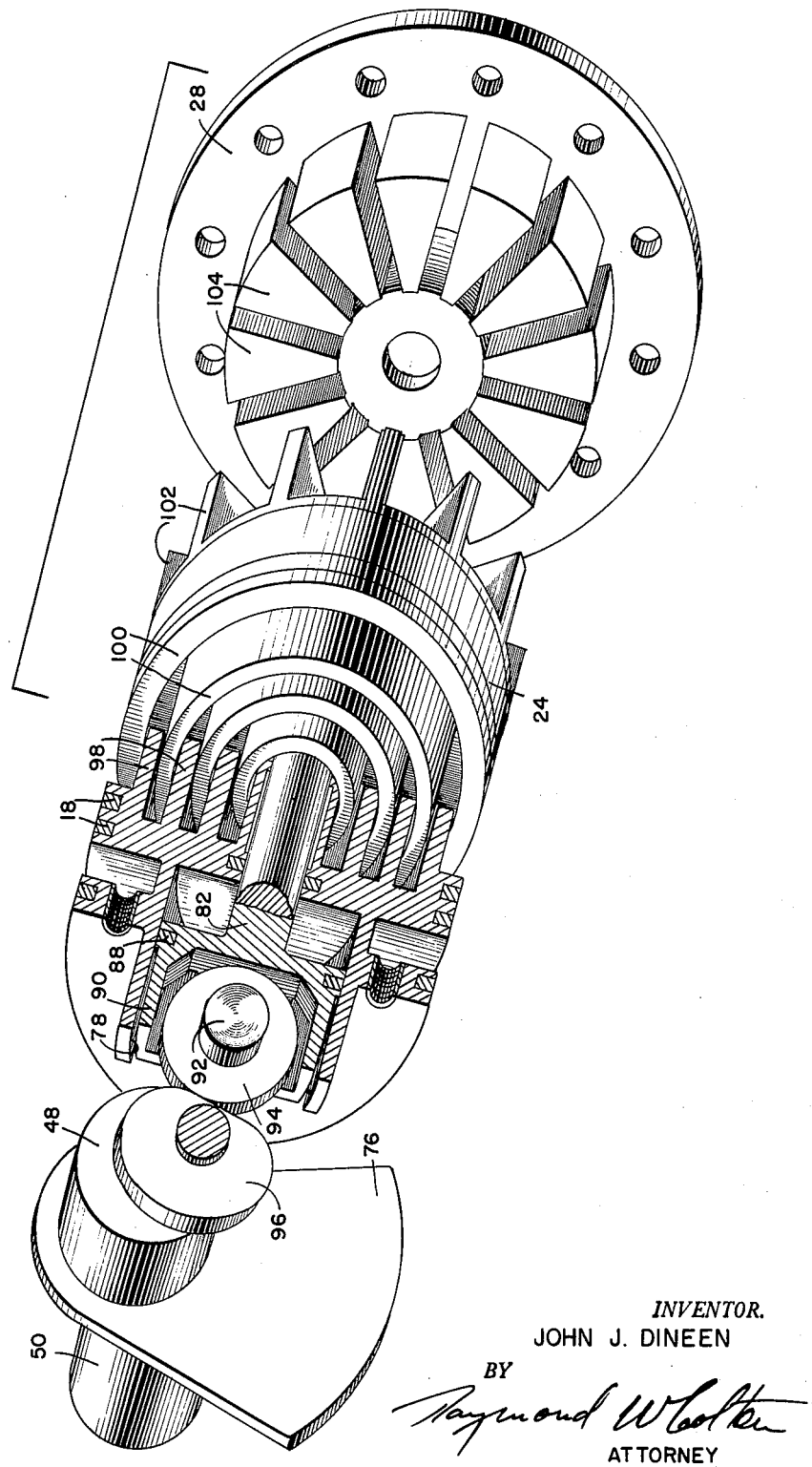
FIG. 6 is an exploded perspective view, partially in section, depicting portions of the engine shown in the preceding figures.

The positions of the power and displacer pistons depicted in FIGS. 1 and 4 of the drawings correspond with the 180° angle of the crank shown in FIG. 5. Under these conditions, the displacer piston has moved to a position about midway between its extreme positions and is moving towards the cylinder head. The expansion stroke of the power piston extends from about 0° to approximately 130° as viewed in FIG. 5, at which time the purge ports are uncovered by the power piston causing working fluid to be exhausted from the cool chamber between the power piston and displacer piston to the aftercooler 134, and at the same time, cooler fluid will be supplied to the cooler chamber between the power piston and displacer piston from the precooler 138 by means of the pump piston 40 operating in cooperation with the check valves 144 and 150. In this way, the compression stroke can be initiated with the working fluid at the lowest temperature available.

By maintaining the displacer piston closely adjacent the power piston during the major portion of the expansion stroke, covering the range of from approximately 35° to approximately 130° in FIG. 5, the maximum portion of the working fluid will be in the hot chamber between the displacer piston and cylinder head to produce the maximum amount of work during expansion. At about the time the purge ports are uncovered, about 130°, the displacer piston changes its direction of travel, displacing working fluid from the hot chamber between the displacer piston and the cylinder head to the cold chamber between the power piston and displacer piston, through the regenerator defined by the conductive mesh or gauze 114 causing the regenerator to store a substantial amount of heat. At a crank position of 180°, the power piston reverses its direction and at about 235°, the purge ports are again covered by the power piston and the compression stroke begins. Also at about 235°, the displacer piston assumes a position closely adjacent the head where the rate of heat transfer is maximum and this position is maintained throughout a dwell period extending to about 345°, representing a major portion of the compression stroke, extending from about 235° to about 360°. Thus it will follow, that the displacer piston remains closely adjacent the power piston during a crank travel of about 95° during the expansion stroke. The displacer piston remains closely adjacent the cylinder head during a crank travel of approximately 105° constituting a major portion of the compression stroke. By virtue of these relationships and the greatly increased surface areas for the transmission of heat between the power piston and displacer piston on the one hand and between the displacer piston and cylinder head on the other, results can be expected with a Stirling cycle engine employing acetylene as a working fluid, far exceeding anything thought to be possible heretofore.

It is contemplated of course, that the principles and structure disclosed herein be extended to engines having multiple cylinders and where three or more such cylinders are employed, starting can be effected without the application of external power. In multiple cylindered engines embodying the present invention, it is contemplated that a shaft driven pump would be used to supply cooled working fluid to all of the cylinders.

Whereas only one specific example of the invention has been described for purposes of illustration, many variations will suggest themselves to those skilled in the art and such variations are intended to be covered by the appended claims.

I claim:
1. A heat engine comprising a housing, a cylinder supported by said housing, a cylinder head closing one end of said cylinder, means for heating said head, a power piston reciprocably received in and coaxial with said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, cam means driven by said shaft, follower means centrally disposed with respect to said displacer piston engaging said cam means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and a surface formed on said cam means maintaining said displacer piston in substantially constant closely spaced relationship with said head during a major portion of said compression stroke.

2. A heat engine comprising a housing, a cylinder supported by said housing, a cylinder head closing one end of said cylinder, means for heating said head, a power piston reciprocably received in and coaxial with said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, cam means driven by said shaft, follower means centrally disposed with respect to said displacer piston engaging said cam means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and a surface formed on said cam means maintaining said displacer piston in substantially constant closely spaced relationship with said power piston during a major portion of said expansion stroke.

3. A heat engine comprising a housing, a cylinder supported by said housing, a cylinder head closing one end of said cylinder, means for heating said head, a power piston reciprocably received in and coaxial with said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, cam means driven by said shaft, follower means centrally disposed with respect to said displacer piston engaging said cam means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and surfaces formed on said cam means maintaining said displacer piston in substantially constant closely spaced relationship with said head during a major portion of said compression stroke and in substantially constant closely spaced relationship with said power piston during a major portion of said expansion stroke.

4. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and complementary interfitting radially disposed heat conducting elements carried by said displacer piston and head respectively.

5. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, throttle means providing a passage communicating with said cool chamber and a valve operated independently of shaft rotation for controlling flow through said passage, a working fluid filling said passage means and chambers, and complementary interfitting heat conducting elements carried by said displacer piston and power piston respectively.

6. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, throttle means providing a passage communicating with said cool chamber and a valve operated independently of shaft rotation for controlling flow through said passage, a working fluid filling said passage means and chambers, complementary interfitting heat conducting elements carried by said displacer piston and head respectively, and complementary interfitting heat conducting elements carried by said displacer piston and power piston respectively.

7. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, throttle means providing a passage communicating with said cool chamber and a valve operated independently of shaft rotation for controlling flow through said passage, and a body of acetylene filling said passage means and chambers.

8. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and means including a port intermittently covered by said power piston for replacing working fluid in said passage and chambers with cooler working fluid.

9. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and spacing means of relatively low heat conductivity interposed between said cylinder and head and having an axial dimension exceeding the stroke of the displacer piston.

10. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, actuating means driven by said shaft, means engaging said actuating means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and means including a pump driven by said shaft and intermittently actuated valve means for replacing working fluid in said chambers with cooler working fluid.

11. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, cam means driven by said shaft, follower means engaging said cam means for driving said displacer piston, heat dissipating means provided for said cylinder, a regenerator providing passage means interconnecting said chambers, a working fluid filling said passage means and chambers, and throttle means providing a passage communicating with said cool chamber and a valve operated independently of shaft rotation for controlling flow through said passage.

12. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, cam means driven by said shaft, follower means engaging said cam means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and fluid pressure means connected to said displacer piston intermediate said follower and displacer piston biasing said follower means towards said cam means.

13. A heat engine comprising a housing, a cylinder supported by said housing, a cylinder head closing one end of said cylinder, means for heating said head, a power piston reciprocably received in said cylinder for movement through compression and expansion strokes, a displacer piston reciprocably received in said cylinder between said power piston and head defining a hot chamber with said head and a cool chamber with said power piston, a shaft journalled in said housing, transmission means interconnecting said power piston and shaft, cam means driven by said shaft, follower means engaging said cam means for driving said displacer piston, heat dissipating means provided for said cylinder, a regenerator providing passage means interconnecting said chambers, a working fluid filling said passage means and chambers, throttle means providing a passage communicating with said cool chamber and a valve operated independently of shaft rotation for controlling flow through said passage, and means intermittently applying fluid pressure to said follower means to bias it towards said cam means in advance of head dead center position of said displacer piston.

References Cited by the Examiner
UNITED STATES PATENTS

| | | | |
|---|---|---|---|
| 607,655 | 7/1898 | Dickerson | 123—1 |
| 966,032 | 8/1910 | Mann | 60—24 |
| 1,553,546 | 9/1925 | Lundgaard | 60—24 |
| 1,730,580 | 10/1929 | Lundgaard. | |
| 2,465,139 | 3/1949 | Van Weenen et al. | 60—24 |
| 2,484,392 | 10/1949 | Van Heeckeren | 60—24 X |
| 2,616,244 | 11/1952 | Veldhuyzen | 60—24 |
| 2,885,855 | 5/1959 | Meyer | 60—24 |

OTHER REFERENCES

Van Weenen: The Construction of the Philips Air Engine, in Philips Technical Review, vol. 9, No. 5 (1947), pp. 125–134, pp. 139, 130 relied on.

SAMUEL LEVINE, *Primary Examiner.*

EDGAR W. GEOGHEGAN, JULIUS E. WEST,
*Examiners.*